July 11, 1961 A. FEINER 2,992,306

MAGNETICALLY CONTROLLED SWITCHING DEVICE

Filed July 1, 1959

INVENTOR
A. FEINER
BY Henry M. Bissell
ATTORNEY

United States Patent Office 2,992,306

Patented July 11, 1961

2,992,306
MAGNETICALLY CONTROLLED SWITCHING DEVICE

Alexander Feiner, Whippany, N.J., assignor to Bell Telephone Laboratories, Incorporated, New York, N.Y., a corporation of New York Filed July 1, 1959, Ser. No. 824,223
17 Claims. (Cl. 200—87)

This invention relates to electrically controlled switching devices and more particularly to such a device utilizing a magnetic field to effect movement of a switch contact.

In switching applications, such as are encountered, for example, in telephone systems, it is necessary to provide interconnecting facilities which are rugged, reliable and economical. An element which satisfies these requirements is the electromechanical switch or relay. However, with the advent of high speed electronic devices, the further requirement of high speed performance is placed upon the relay in order to keep pace with the balance of the telephone system operation.

Normal relay operation is realized by energizing a coil on the relay which in turn establishes a magnetic field that operates the relay contacts. Removal of the source of energy from the coil permits the magnetic field to collapse and the relay contacts to be restored to normal. In practice the electromagnetic field may be established in a small fraction of a millisecond. The relay contacts, on the other hand, require a significantly longer time to respond. Even though the contacts, once operated, may be held closed by other means such as mechanical or magnetic latching arrangements, the electromagnetic field must be maintained until the relay is operated.

As the operation of the relay contacts is slow relative to the speed of operation of electronic components, systems employing such relays in particular areas, such as the subscriber line interconnections in a telephone system, necessarily are limited in overall speed of operation by the response time of the relay. As a result considerable effort has been expended in a search for devices which perform equivalent switching functions in a sufficiently short response time to be compatible with electronic control equipment. In general, such devices have not been found which possess all of the desirable characteristics of the relay.

One solution to this problem is disclosed in copending application Serial No. 824,222 filed July 1, 1959, of A. Feiner, C. A. Lovell, T. N. Lowry and P. G. Ridinger. Devices disclosed therein render the relatively slow response mechanical switch itself compatible with electronic control signals. This compatibility is achieved by the combination of a bistable remanently magnetic element with a magnetically responsive mechanical switch. The bistable element is pulsed by electronic control signals and assumes a corresponding remanent magnetic condition. Thereafter, in its normal response time, the associated switch responds to this remanent magnetic condition. Thus, in a telephone system employing such devices electronic control equipment is not tied up by the necessity of maintaining the magnetic field of the relay until its switch contacts operate.

The instant invention providese a similar solution to the problem. Thus, it is an object of this invention to provide an improved electromechanical relay.

More particularly, it is an object of this invention to provide a relay which is responsive to electronic control pulses.

Specifically it is an object of this invention to improve the sensitivity of such a relay.

The instant invention accomplishes these and other objects by providing in one specific embodiment thereof a hollow cylinder of a ferrite material connected by magnetically permeable members to the terminals of a magnetically responsive switching device such as, for example, a glass-sealed reed switch. This switch is of the type described in "Design of Reed Switches and Relays," by O. M. Hovgaard et al., volume 34, Bell System Technical Journal, page 309 ff., and is suitable for use in this invention because of its sensitivity to slight magnetic fields. An operate coil is wound about the ferrite cylinder while a release lead threads the longitudinal axis of the cylinder to permit control of the relay by electronic current pulses.

The ferrite cylinder, being of a material exhibiting a plurality of stable remanent magnetization states, may be set in one of these states by current pulses of short duration in the operate winding. The remanent magnetization state thus established produces opposite magnetic poles at the two ends of the cylinder which in turn produce magnetic flux in the path including the reed switch so as to close the switch contacts in the normal response time of the switch.

The switch contacts may be released by eliminating the magnetic poles at the ends of the cylinder. This is accomplished in accordance with the invention by passing a current through the release lead axially threading the cylinder. Such a current produces a magnetization state in the ferrite which directs flux in a circular direction around the cylinder transverse to its axis rather than through the switch. Thus, in this condition of the ferrite cylinder, the switch is released. Consequently, this embodiment of the invention provides for the control of a pair of switch contacts by electronic pulses shorter in duration than the normal response time of the switch.

It is a feature of this invention that an electromechanical relay having a plurality of current carrying conductors associated therewith be operable by current in either direction on one of said conductors and releasable by current in either direction on the other of said conductors.

More specifically, it is a feature of this invention that an electromechanical relay be operable in response to the longitudinal flux state established in a remanent magnetic member and releasable in response to a transverse circular flux state established in the remanent magnetic member.

Another feature of this invention is the combination of an electromechanical relay with a remanently magnetic member comprising a hollow cylinder which may be set in one of its remanent magnetization states by a current in a winding about the cylinder and in another remanent magnetization state by current in a lead axially threading the cylinder.

A complete understanding of this invention and of these and various other features thereof may be gained from consideration of the following detailed description and the accompanying drawing, in which.

Figure 1:
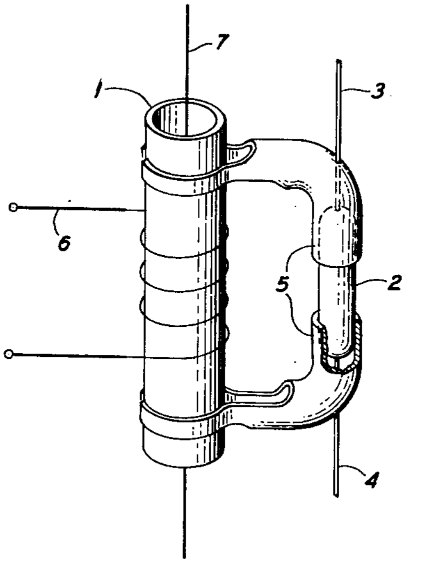
FIG. 1 depicts one specific embodiment of my invention.

In FIG. 1, a hollow cylinder 1 of a material exhibiting a plurality of stable remanent magnetic states is shown having a conductor 6 wound thereon. This material advantageously may be one of the ferrites such as are used for magnetic memory cores. A second conductor 7 is shown longitudinally threading the cylinder 1. A magnetic reed switch 2 is supported by, and has its opposite terminals 3 and 4 connected to, the opposite ends of the cylinder 1 by a pair of magnetically permeable members 5. Thus, there is provided between the ends of the cylinder 1 an external magnetically conducting path for directing magnetic flux from the cylinder 1 to the switch 2. This switch, being responsive to magnetic flux, operates when opposite magnetic poles are produced at the respective ends of the cylinder 1. Correspondingly, contacts of the switch 2 release upon the elimination of the magnetic poles at the ends of the cylinder 1.

Figure 2A:
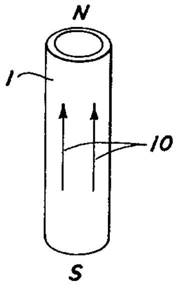
FIGS. 2A and 2B represent different magnetization states of a portion of the structure depicted in FIG. 1.

In the operation of this invention, the condition of the contacts of the switch 2 is controlled by the magnetization state of the cylinder 1. This in turn is controlled by driving currents respectively over the conductors 6 and 7. For example, magnetic poles at the ends of the cylinder 1 may be produced by driving a current through the conductor 6. The cylinder 1 remains in the magnetization state to which it is set by the pulse of current on the winding 6. This magnetization state is represented schematically in FIG. 2A which shows the arrows 10 representing magnetic flux directed longitudinally in the cylinder 1. For the flux direction shown a north magnetic pole is produced at the upper end of the cylinder 1 and a south magnetic pole is produced at the lower end thereof. In the structure of FIG. 1, the return path of the flux includes the switch 2. Thus, the contacts of the switch 2 are closed by magnetic flux from the poles at the ends of the cylinder 1. The sense of the winding of the conductor 6 and the polarity of the current pulse thereon are immaterial in the operation of this invention since the contacts of the switch 2 are responsive to magnetic flux in either direction.

Figure 2B:
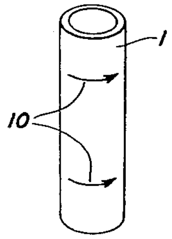

A current pulse on the conductor 7 which may also be of either polarity produces a circular magnetization in the cylinder 1. Such a magnetization state is illustrated in FIG. 2B which shows the arrows 10 representing one particular flux direction about the cylinder 1. It can readily be seen that this magnetization state produces no external poles at the ends of the cylinder, all of the magnetic flux being contained within the cylinder itself. As a result, there is no magnetic flux along the external path including the switch 2 so that the contacts of the switch 2 revert to the released position under the influence of their resilient supporting members within the switch envelope. As before, the current in the conductor 7 may flow in either direction to produce the release of the contacts of the switch 2 since the direction of the circular flux shown in FIG. 2B is immaterial.

The operation of the relay depicted in FIG. 1 can be considered to proceed in two steps. Initially, a magnetization state of the cylinder 1 is established. Thereafter in response to this magnetization state and in its own natural response time, the switch 2 assumes the contact condition which corresponds to the magnetization state of the cylinder 1. Once established, the magnetization state remains until another current pulse is applied to change it. Since the response time of the remanent magnetic material of the cylinder 1 is a very small fraction (in most cases less than one percent) of the response time of the switch 2, it is now clear that my invention provides compatibility between a magnetically responsive mechanical switch and very short electronic control pulses. As a matter of fact, the magnetization condition of the cylinder 1 may be switched from the state of FIG. 2A to the state of FIG. 2B and back in a time short enough to prevent any change in the contact condition of the switch 2. Furthermore, whether the remanent magnetic material be in the longitudinal state or the circular state, the flux direction may be reversed by suitably applied control pulses on either of conductors 6 and 7 without changing the contact condition of the switch 2. Thus, an exceedingly versatile relay is provided for effecting the control of a mechanical switch by electronic signals.

It will be clear to those versed in the art that the winding 6 may be replaced by a pair of windings, if desired, and pulses applied to both of such windings to attain coincident drive of the depicted device. In this manner a particular one of a plurality of such devices arranged in a matrix array may be selected by applying simultaneous signals to particular row and column leads respectively connected to a number of such row- and column-associated devices in series. The applied signals are of such magnitude as is known in the art that only at the relay where the respective magnetizing forces of the applied signals are combined is the remanent magnetization reversed. Thus, only the selected relay is affected by the applied signals.

It is to be understood that the above described arrangements are illustrative of the principles of the invention. Numerous other arrangements may be devised by those skilled in the art without departing from the spirit and scope of the invention.

What is claimed is:

1. An electrical switching device comprising a magnetically responsive switch, a hollow cylinder of a magnetic material capable of assuming a plurality of stable remanent magnetization states, magnetically permeable means connecting corresponding ends of said cylinder and said switch in a low reluctance magnetic circuit, first current conducting means wound on said cylinder for establishing a first one of said magnetization states to direct magnetic flux through said circuit and operate said switch, and second current conducting means axially threading said cylinder for establishing a second one of said magnetization states directing said magnetic flux around said cylinder to release said switch.

2. In combination, a magnetically responsive switch, a hollow cylinder of a magnetic material capable of assuming a plurality of stable remanent magnetization states, magnetically permeable means connecting said switch in a magnetic circuit between the ends of said cylinder, first current conducting means for establishing a longitudinal magnetization state in said cylinder to direct magnetic flux through said switch, and second current conducting means for establishing a circular magnetization state in said cylinder to direct said magnetic flux away from said switch.

3. The combination of claim 2 wherein said first current conducting means comprises a coil on said cylinder.

4. The combination of claim 2 wherein said second current conducting means comprises a wire longitudinally threading said hollow cylinder.

5. The combination of claim 2 wherein said magnetic material comprises a ferrite.

6. An electrical switching device comprising a magnetically responsive switch, a hollow cylinder of a magnetic material having at least two stable remanent magnetization states, magnetically permeable means connecting said switch with the ends of said cylinder, first means for establishing a longitudinal remanent magnetization state in said cylinder to operate said switch, and second means for establishing a transverse remanent magnetization state in said cylinder to release said switch.

7. An electrical switching device in accordance with claim 6 wherein said first means comprises a current conducting coil wound on said cylinder.

8. An electrical switching device in accordance with claim 6 wherein said second means comprises a current conducting lead axially threading said cylinder.

9. In combination, a magnetically responsive switch, a hollow cylinder of a magnetic material exhibiting a plurality of stable remanent magnetization states, magnetically permeable means connecting said cylinder and said switch in a magnetic circuit, and means for actuating said switch comprising first current conducting means for establishing a longitudinal remanent magnetization state in said cylinder and second current conducting means for establishing a transverse remanent magnetization state in said member.

10. The combination of claim 9 wherein said first current conducting means comprises a wire wound about said cylinder and said second current conducting means comprises a wire axially threading said cylinder.

11. The combination of claim 10 wherein said magnetic material comprises a ferrite.

12. An electrical switching device comprising a magnetically responsive switch, a hollow cylinder of a material exhibiting a plurality of stable remanent magnetization states, magnetic flux directing means connecting the terminals of said switch to corresponding ends of said cylinder, means for establishing a particularly aligned remanent magnetization state in said cylinder by applying first pulses of either polarity to operate said switch, and means for establishing a differently aligned remanent magnetization state in said cylinder by applying second pulses of either polarity to release said switch.

13. An electrical switching device comprising a magnetically responsive switch, a hollow cylinder of a material exhibiting a plurality of stable remanent magnetization states, and means for establishing a predetermined one of said stable remanent magnetization states in a discrete time interval, whereby said switch responds to said established stable ramanent magnetization state in a succeeding discrete time interval after the deenergization of said establishing means.

14. An electrical switching device in accordance with claim 13 further comprising magnetically permeable means connecting the terminals of said switch to corresponding ends of said cylinder.

15. An electrical circuit comprising a magnetically responsive switch, a hollow cylinder of magnetic material capable of assuming a plurality of stable remanent magnetization states including a first stable state in which a magnetic field is established along said cylinder and through said switch and a second stable state in which a magnetic field is established around said cylinder, and means for actuating said switch comprising current conducting means adjacent said cylinder for establishing said first and second stable states in said cylinder in succession.

16. An electrical switching device comprising a magnetically responsive switch, an elongated magnetic core means having a longitudinal axis, said core means being of a material having substantially rectangular hysteresis characteristics, magnetically permeable means connecting said switch with the ends of said core means, means for establishing a remanent magnetization in said core means in a direction along said longitudinal axis to operate said switch, and means for establishing a circular remanent magnetization in said core means around said longitudinal axis to release said switch.

17. An electrical switching device comprising a pair of magnetic electrical contacting members operable responsive to the passage of a magnetic flux therethrough, an elongated magnetic core means having a longitudinal axis, said core means being of a material having substantially rectangular hysteresis characteristics, magnetic means for completing a flux path through said core means along said longitudinal axis and through said contacting members, means for inducing a remanent magnetic flux in said core means along said longitudinal axis to operate said contacting members in one position, and means for inducing another remanent magnetic flux in said core means circularly around said longitudinal axis to operate said contacting members in another position.

References Cited in the file of this patent

UNITED STATES PATENTS 2,312,669 Nippert ---------------- Mar. 2, 1943
2,378,986 Dickten -------------- June 26, 1945